FAIL-SAFE TYPE LOGIC CIRCUIT SYSTEM

Inventors:

By

Attorney

Inventors:
Yasuo Komamiya
Kazuyoshi Kurodara
Seiji Tsuchiya
Noriaki Takeuchi
Kenji Okamoto
By Ernest Montague
Attorney April 21, 1970 YASUO KOMAMIYA ET AL 3,508,078

FAIL-SAFE TYPE LOGIC CIRCUIT SYSTEM

Filed Sept. 1, 1966 5 Sheets-Sheet 3

Inventors:
Yasuo Komamiya
Kazuyoshi Morisawa
Seiji Tsuchiya
Noriaki Takeuchi
Kenji Hamato
By Ernest G. Montague
Attorney Inventors:
Yasuo Komamiya
Kenji Okamoto
By
Attorney

FAIL-SAFE TYPE LOGIC CIRCUIT SYSTEM

Filed Sept. 1, 1966 5 Sheets-Sheet 5

Inventors:
Yasuo Komamiya
Kazuyoshi Mumakawa
Seiji Tsuchiya
Noriaki Takeuchi
Kenji Okamoto
By Ernest G. Montague
Attorney 3,508,078
Patented Apr. 21, 1970

3,508,078

FAIL-SAFE TYPE LOGIC CIRCUIT SYSTEM

Yasuo Komamiya, Yokohama, Kazuyoshi Morisawa, Tokyo, Seiji Tsuchiya, Ohmiya-shi, Noriaki Takeuchi, Urawa-shi, and Kenji Okamoto, Tokyo, Japan, assignors to Agency of Industrial Science and Technology, Tokyo, Japan, a corporation of Japan Filed Sept. 1, 1966, Ser. No. 576,716
Claims priority, application Japan, Sept. 2, 1965, 40/53,385; Sept. 25, 1965, 40/58,335; Dec. 15, 1965, 40/76,732; July 18, 1966, 41/46,522
Int. Cl. H03k *19/08, 19/24, 19/32*
U.S. Cl. 307—238 6 Claims

ABSTRACT OF THE DISCLOSURE

A fail-safe system comprising an oscillator capable of performing a logical operation having a threshold input level and operable at a certain frequency in response to an input higher than the threshold level, an amplifier connected to the oscillator to amplify the output signal of the oscillator, a rectifier connected to the output of the amplifier to rectify the output signal of the amplifier, and a power supply for applying a bias voltage which maximum voltage is equal to the threshold voltage, to make binary codes 1 and 0 to be used in the system correlate to D.C. voltages +V and −V, respectively, and to cause the output voltage level of the system −V or 0 in case any trouble occurs while its normal output voltage is +V, and the output voltage level of the system −V or 0 in case any trouble occurs in the system while its normal output voltage is −V, whereby the output voltage never becomes +V whenever any trouble occurs.

The present invention relates to a novel fail-safe system, in general, and to a fail-safe system which is applicable to basic logic circuits in an electronic computer to make these logic circuits and hence the computer a fail-safe type and which system is able to stop the operation of the computer when any error or failure occurs in the logic circuits.

Electronic computers have been widely applied to various fields in industry because of their capability of handling a large volume of information at high speed. It is noted, however, that, if any failure should occur in an electronic computer for any reason and an erroneous output information from the computer is used as it is in its field of application, there is a strong probability of the occurrence of great damage in the field. Although various kinds of devices or systems for detecting such failures are generally provided in any computer for safety purpose, the complete elimination of such failures itself is very difficult at the current technical level. Therefore, any electronic computer having a system which is able to maintain its application field safe by preventing any transmission of output information of the computer to the field, whenever it operates erroneously, is seriously desired and such characteristics of the computer are referred to as fail-safe type characteristics.

For example, a control system for a railroad transportation system which controls the switching operations of the signals or the rails, and which railroad transports a large volume of objects as well as people, requires such a fail-safe type computer, because if any erroneous information from the computer, resulting from any failure in its constituent components, is supplied to such a control system, there is a strong probability of great accident. Any electronic computer currently used in each industrial field does not have such fail-safe characteristics.

It is an object of the present invention to provide a novel fail-safe type logic circuit system which can be used in a computer to provide it with fail-safe characteristics.

The check of any error or failure in a computer must generally be performed in its software or performed by providing such a check function in its hardware. However, such a check by the software may not be possible theoretically. On the other hand, if the check is to be performed by the hardware, which may be a parity check, it is very difficult when two or more errors occur simultaneously in the computer. Therefore, to perform such a check for a plurality of errors occurring at different points, the hardware must be provided with such a special function. However, to date, hardware having this special function has not been provided because of technical and/or economical difficulties.

The present invention utilizes a novel fail-safe type logic circuit system to provide a fail-safe type computer, which system is applied to the basic logic circuits that are indispensable to the computer.

It is another object of the present invention to provide certain fail-safe type logic circuits constituting an electronic computer.

With the above and other objects of the present invention in view, which will become apparent from the following description, the present invention will be clearly understood in connection with the detailed description and the accompanying drawings, in which.

Figure 6:
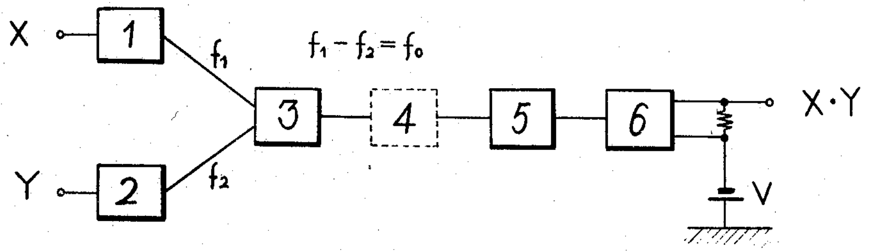
FIG. 6 shows a block diagram of a fail-safe type logic product circuit constituted with the basic logic circuit of FIG. 5.
Figure 8A:
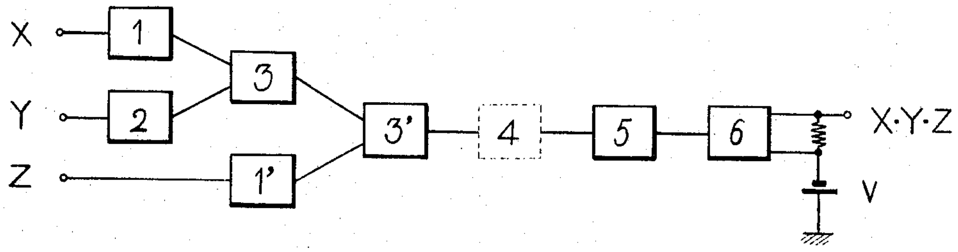
Figure 8B:
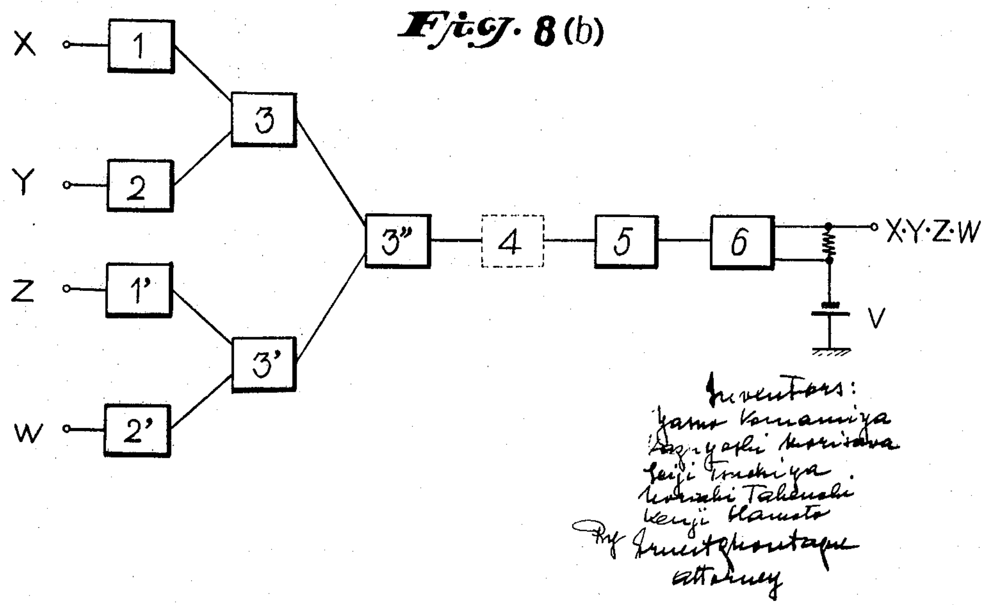
Figure 9:
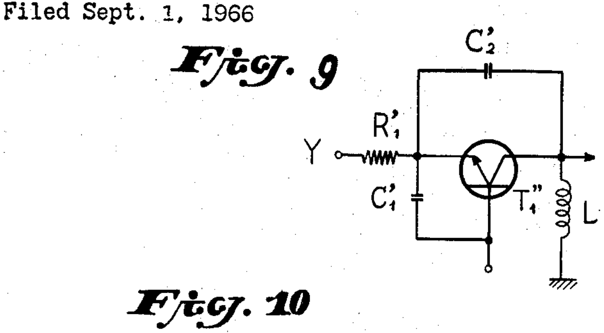
Figure 10:
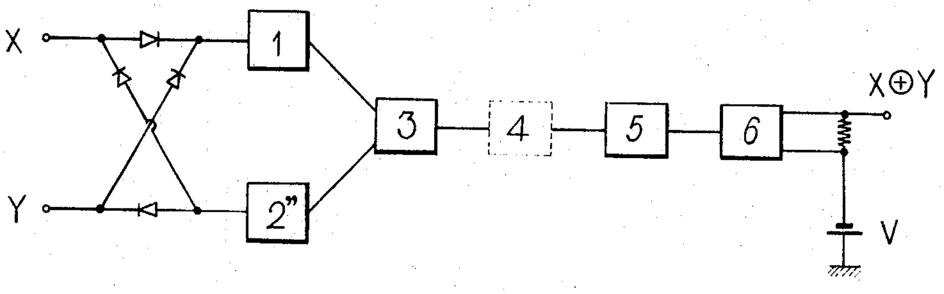
Figure 11:
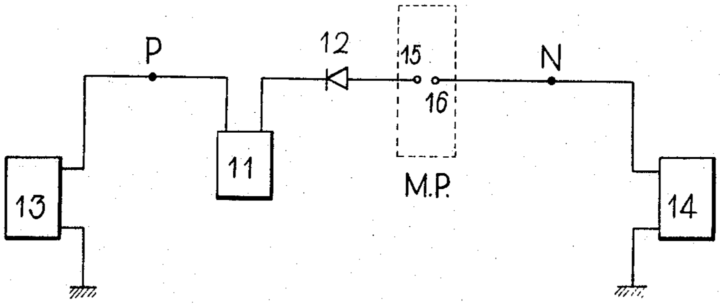
Figure 12:
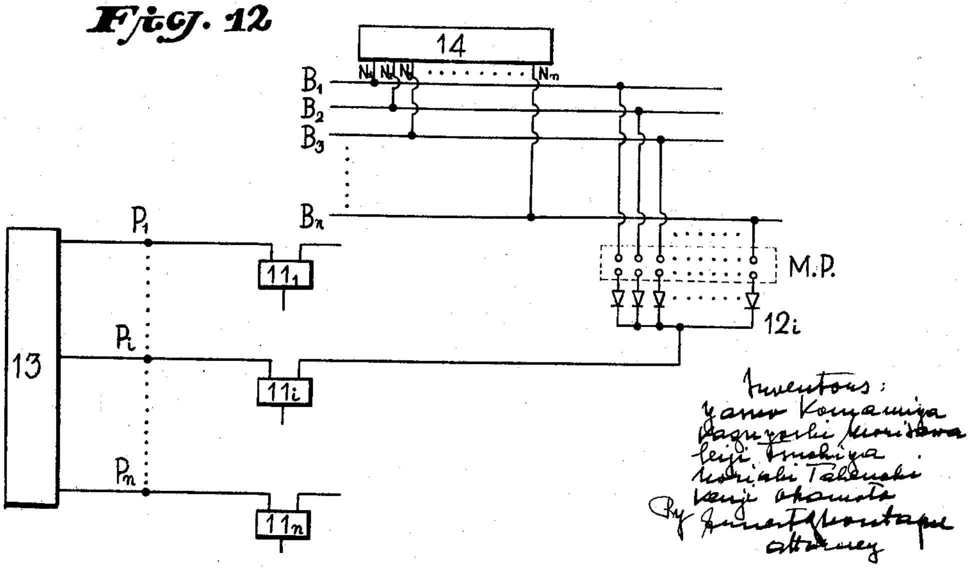
Figure 13:
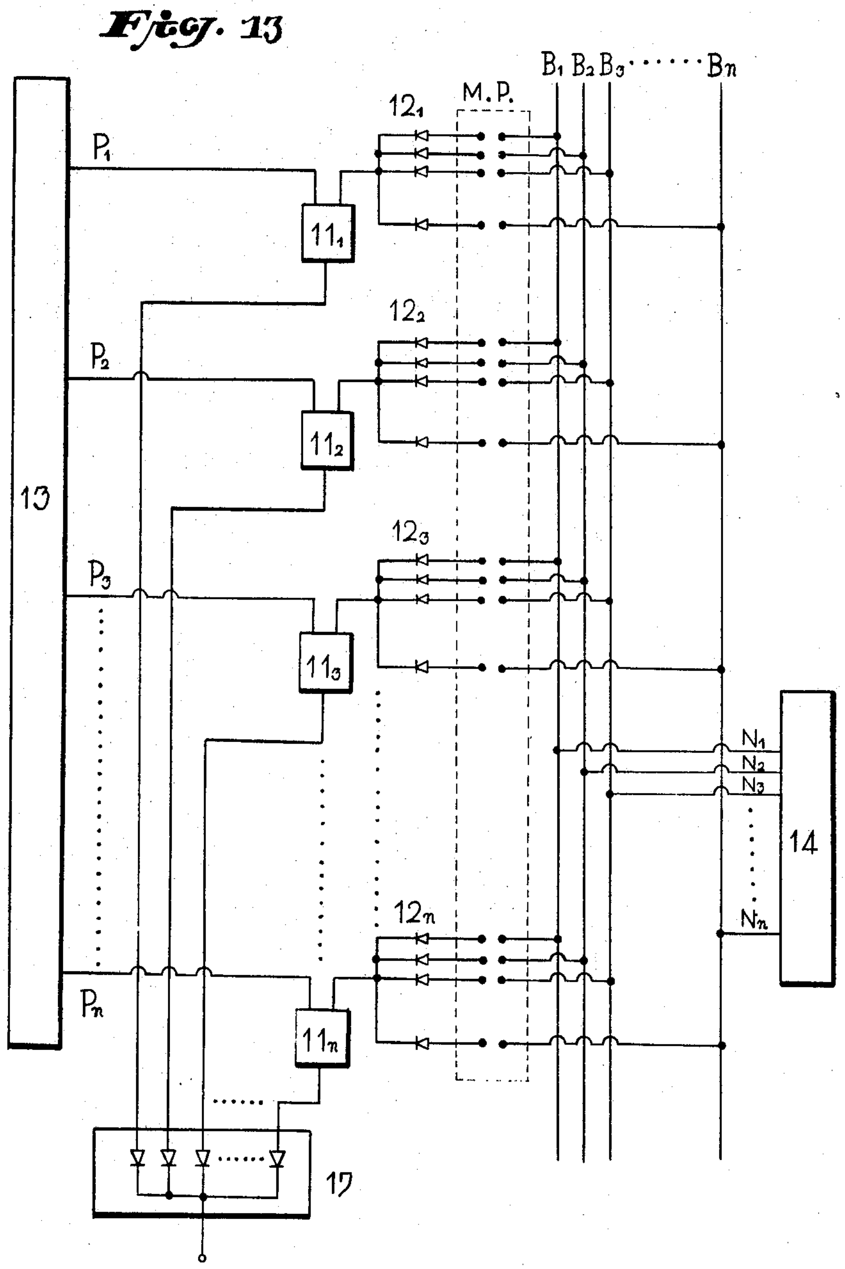
Figure 14:
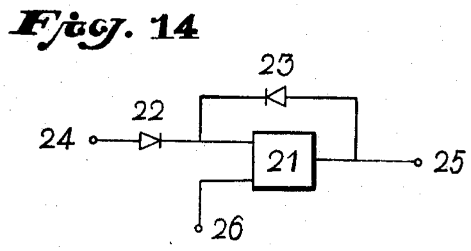

FIGS. 8(*a*) and 8(*b*) are block diagrams of fail-safe type AND circuits with three inputs and four inputs, respectively, which are readily constructed on the basis of the logic product circuit of FIG. 6;

FIG. 9 is a circuit diagram of an embodiment of an oscillator with a certain threshold input level, which operates in response to the logical variable 0 at its input;

FIG. 10 is a block diagram of the fail-safe type exclusive-or circuit;

FIG. 11 is a circuit diagram showing a basic circuit of the fail-safe type fixed memory circuit;

FIG. 12 is a circuit diagram of the fail-safe type fixed memory circuit;

FIG. 13 is a circuit diagram showing another embodiment of the fail-safe type fixed memory circuit; and FIG. 14 is a circuit diagram of the fail-safe type memory circuit.

Figure 1:
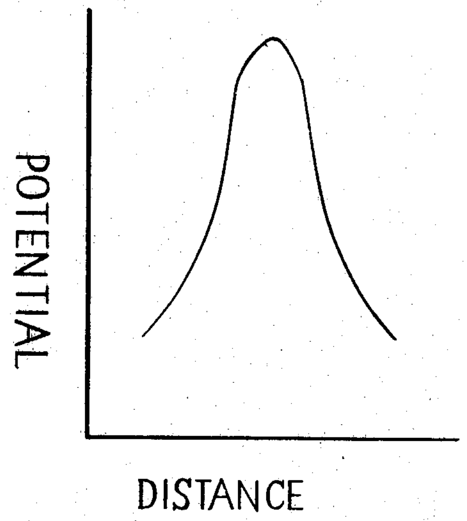
FIGURE 1 is a graph showing the concept of the maximum potential, which is used to constitute the present fail-safe type logic circuit.
Figure 2:
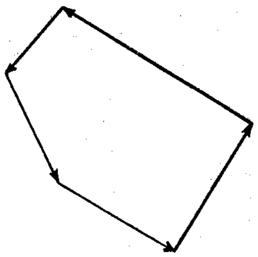
FIG. 2 is a vector diagram showing that the vector sum equals zero, which is also used to constitute the present fail-safe logic circuit.

Referring now to the drawing, and more particularly to FIGS. 1 and 2, the circuit conditions necessary to make the basic logic circuits of an electronic computer fail-safe type, respcetively, are illustrated. The first condition illustrated in FIG. 1 is the concept of the maximum potential and the second condition illustrated in FIG. 2 is the concept that the vectro sum becomes zero. The concept in FIG. 1 is required to make any logic circuit operative only when an inut at or higher than a predetermined level is received and, otherwise, that is, to make it inoperative, when the input is lower than the predetermined level because of any failure in the preceding logic circuit. That is, any logic circuit using this concept has a tendency to slow down its potential level and thus terminate its operation upon receipt of a lower input than a predetermined level, and an oscillator having a certain thereshold input level (such oscillator operates at a constant frequency with a higher input than the threshold level and otherwise stops its operation) can be presented as an example of the devices operating with this concept. Further, a resonance phenomenon is an example of the concept itself. The second concept in FIG. 2 will be explained in detail hereinafter. It is merely described, at this time, that with the second concept, a fail-safe type logic product circuit can be constituted.

In forming the present logic circuit system and its applications with these concepts, the conditions to be given to the present system are as follows:

(1) The use of the first concept to operate any circuit in the system at, or higher input levels than, a predetermined level. For example, an oscillator is used as a circuit operable in accordance with the first concept, in which if the oscillator with a threshold value is used, any oscillation due to noise can be prevented by screening the threshold level properly.

(2) The binary 1 and 0 used in the logic system are represented by voltage levels of +V and −V, respectively, rather than representations by voltage levels of +V and 0 or by the presence and absence of a pulse in the ordinary manner. Thus, even when any grounding occurs in any point in the circuit, the failure can easily be detected.

(3) The characteristics of the system or the logic circuits are determined as follows:

(3–1) The output information corresponding to 1 in the binary code (the voltage +V) may become binary 0, i.e., a voltage level of −V when any circuit failure occurs.

(3–2) The output information corresponding to 0 in the binary code (the voltage −V) may remain at binary 0 when any circuit failure occurs, but the output never becomes binary 1, i.e., a voltage level of +V.

Each logic circuit to be constructed with the present system is constructed to have the fail-safe function in itself with the first condition.

Figure 3:
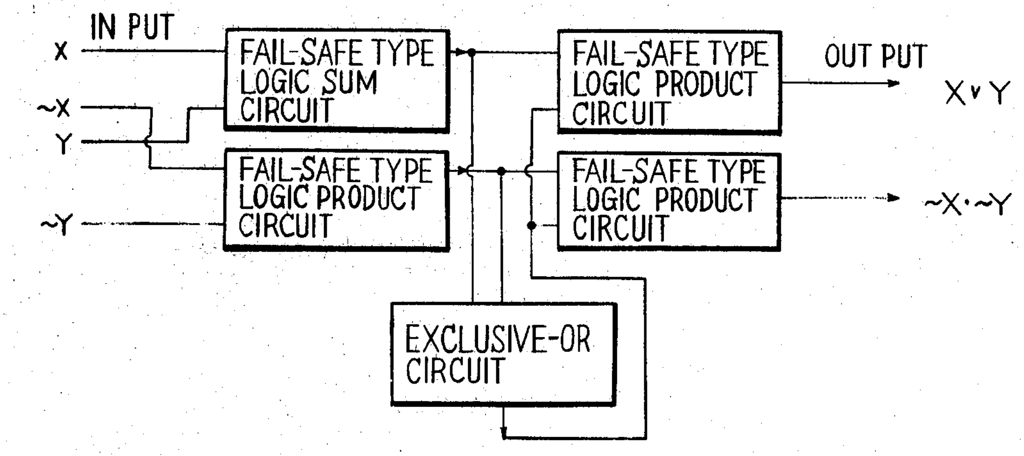
FIG. 3 is a block diagram of the logic circuit unit in accordance with the present invention, in which an EXCLUSIVE-OR circuit is used to check the output of the unit.

In the construction of the present miss operation check system using these logic circuits the proper circuit and the conjugate circuit are used as a unit. Here, the words "the conjugate circuit" mean the circuit which has the negation function of the proper circuit. The check of a failure or a miss operation are done in each stage by an exclusive-or circuit as shown in FIG. 3. Accordingly, the detection of all failures in a plurality of units becomes possible and the information will be transmitted only when the entire system including a plurality of the units operates normally by forming a sequnece of a chain of the excusive-or circuit, in an asynchronous manner.

For example, in performing a logic operation of $$XvY(\leftrightarrows Z)$$

in the unit system as shown in FIG. 3, this unit system is necessary to have a proper information bus X and a conjugate information bus ∼X (the negation of X). Concerning information Y, the proper and conjugate information buses are provided in the same way as X. Then, XvY is obtained from X bus and Y bus, and $\sim X\cdot\sim Y$ is obtained from ∼X bus and ∼Y bus. Also XvY bus and $\sim X\cdot Y$ are bus checked by the logic product thereof derived from the exclusive-or circuit.

Figure 4:
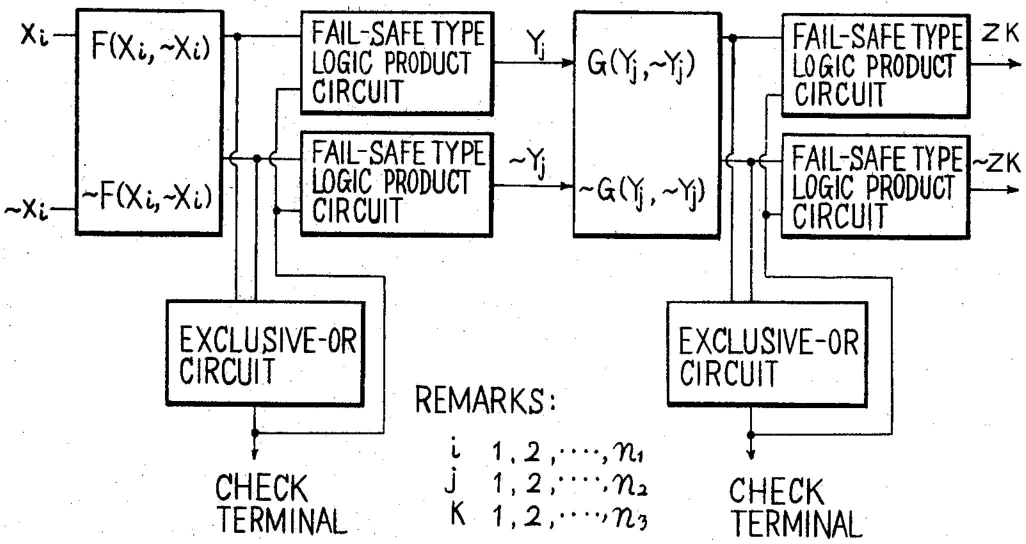
FIG. 4 is a block diagram of the entire logic circuit system of the present invention.

The construction of the entire check system in accordance with the present invention is shown in FIG. 4. For example, if indication lamps are connected to the output of the respective exclusive-or circuits, the detection of failures in the logic system and the maintenance thereof will become easy because the indication lamps may be arranged to illuminate when the unit in concern is operating properly, and the lamps otherwise going out, and thus it is clearly indicated that, when a certain lamp goes out, at least the unit of concern or the preceding unit has a failure therein.

In an electronic computer, the logic circuits which can be provided with the fail-safe characteristics in accordance with the present invention may include the logic product circuit, the logic sum circuit, the exclusive-or circuit, the logic negation circuit, the fixed memory circuit, and the memory circuit. Hereinafter, these respective circuits will be explained.

Figure 5:
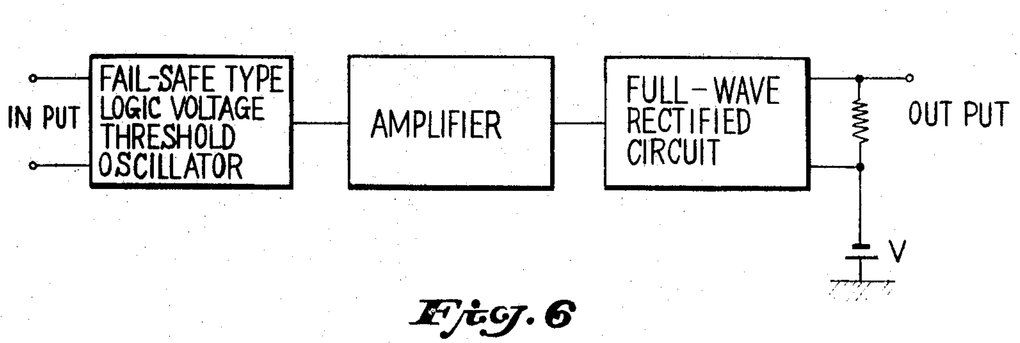
FIG. 5 shows a block diagram of the basic logic circuit of the present invention.

Generally, to check whether an input signal supplied to each logic circuit is |V| properly, or not, the input signal is supplied to an oscilaltor which has a certain threshold level |U| as shown in FIG. 5 and which operates at a certain frequency, $f_0$, at, or at higher input levels, than the threshold level |U|. The threshold voltage |U| is selected as $|V|>|U|>0$, and, in this range of |U|, a self- oscillation of the oscillator by less than the level |U| can be prevented and the operation of the oscillator becomes reliable at the correct signal level.

Next, the output voltage with frequency component, $f_0$, from the oscillator is amplified in a tuned amplifier whose tuning frequency is equal to $f_0$. Thus, whenever a logic operation is not performed correctly and the frequency from the oscillator deviates from $f_0$, or if any failure in the resonance circuit occurs or if there are any inferior circuit components, the output of the tuned amplifier decreases considerably. Accordingly, only when the input signal level is correct or normal and all of the circuit components are operating correctly, is the output voltage of the tuned amplifier maintained at its normal level.

The output of the tuned amplifier with frequency component $f_0$ is full-wave rectified and the rectified voltage is applied across the load resistance. The lower end of the resistor is connected to the voltage −V (corresponding to 0 in the binary code) and the upper end thereof is regarded as the output of the logic circuit. Therefore the rectified output voltage of the logic circuit has a normal value only when the input voltage and the used parts are normal, and otherwise it would never become +V (binary 1) although it may decrease. Namely, it is possible to obtain the fail-safe type logic circuit satisfying the conditions.

A fail-safe type logic product circuit which is the most basic in logic circuits is explained herein. The voltage +V −V corresponds to the truth value 1, 0 of the logic variable X, Y, respectively, and the threshold voltage is +U $(+U<+V)$ as previously mentioned.

As shown in FIG. 6, oscillator 1 has the threshold voltage +U and operates at frequency $f_1$ which is determined by the circuit constant only when the input logic variable X corresponds to the truth value 1 $(+V>+U)$, and otherwise it is inoperative. Oscillator 2 with threshold voltage +U, i.e., the same as that of oscillator 1, operates at a different frequency $f_2$ only when the input logic variable Y corresponds to the truth value 1 $(+V>+U)$. Mixer 3 is used to obtain the difference frequency between $f_1$ and $f_2$ when the frequencies $f_1$, $f_2$ are supplied to its input. Namely, the output $f_0$ of the mixer 3 is, $$f_0=|f_1-f_2|$$

This will be noted that when frequencies $f_0$, $f_1$, $f_2$ are considered as vectors, respectively, the above representation shows the second concept, i.e., "vector sum is zero." In usual cases, it is enough, but more strictly, to use filter 4, such as a mechanical filter, or a ceramic filter. Although $f_0$ may be produced by the sum of $f_1$ and $f_2$, it is desirable that $f_0$ is the difference of $f_1$ and $f_2$ because if the former $f_0$ is used there are some problems in the circuit design due to the harmonics of frequencies $f_1$, $f_2$, and thus the circuit may not become fail-safe. A tuned amplifier 5 amplifies the output having $f_0$ frequency component from the mixer 3 or filter 4. Fullwave rectifying circuit 6 is connected to the output of amplifier 5 so that the output thereof becomes +V when the input frequency of amplifier 5 is $f_0$, but —V otherwise.

In this construction, the output can be obtained from rectifier 6 only when the input logic variables X, Y to oscillators 1 and 2 have the truth value 1 (voltage +V), respectively, while in other combinations of variables X, Y, the output of the rectifier 6 becomes —V. The output of the rectifier 6 represents the logic product $X \cdot Y$ of the logic variables X, Y.

Next, an embodiment of the fail-safe type logic product circuit, constructed with the above described fail-safe logic circuit system is described. Referring now again to the drawings, and more particular to FIG. 7, a pair of similar transistorized colpitts oscillators are provided for the input logic variables X and Y, respectively, each of which comprises ($T'_1$) p-n-p transistor $T_1$, an inductance L (L'), and capacitors $C_1$, $C_2$ ($C'_1$, $C'_2$). The bases of transistors $T_1$ and $T'_1$ are connected to the threshold voltage +U, and therefore the threshold voltage thereof, +U are made +U. The oscillation frequencies of these oscillators may be determined by the respective circuit constants, and it is assumed that the frequency of the oscillator including transistor $T_1$ is $f_1$ and the frequency of the other is $f_2$. By this way, these oscillators operate at their respective frequency only when both variables X, Y have voltage +V corresponding to the truth value 1. The frequencies $f_1$ and $f_2$ are mixed upon the use of the non-linear characteristic (square characteristic) between base and emitter of transistor $T_2$ and resistors $R_2$, $R'_2$, $R_3$ and frequency component $f_0$ corresponding to the difference between $f_1$ and $f_2$ is obtained at the collector of transistor T, with a tank circuit which resonates at $f_0=|f_1-f_2|$. The $f_0$ component is amplified by transistor $T_3$ and rectified by a full-wave rectifier. As a result, voltage +V or —V is obtained across the output resistor, which voltage corresponds to the truth value 1 ($X \cdot Y=1$) or 0 ($X \cdot Y \neq 1$).

As mentioned above, the output on the resistor never becomes +V because of the use threshold voltage +U which is less than +V corresponding to the truth value 1 of the logic variable. Therefore any miss operation in one unit is not transferred to the next stage. Further, the fail-safe function is reinforced because the mixing and amplifying circuit resonates at frequency $f_0$ and the output will go down or tend to go down to —V when frequency $f_0$ is shifted due to any characteristic failures in the circuit components.

FIGS. 8(*a*) and 8(*b*) are modifications of the fail-safe type logic product circuit shown in FIG. 6 with three and four inputs, respectively. In FIGS. 8(*a*) and 8(*b*) oscillators 1, 2, 1' and 2' have a common threshold value and operate at frequencies $f_1$, $f_2$, $f'_1$ and $f'_2$, respectively. Each mixer 3, 3' or 3'' is connected to respective outputs of the preceding two oscillators and take out the frequency difference of two inputs frequencies, respectively. Filter 4 may be provided if desired. Tuned amplifier 5 and full wave rectifier 6 are also provided and serve as previously described. The output, $f_0$ of mixer 3', shown in FIG. 8(*a*), is represented as $$f_0=||f_1-f_2|-f_1'|$$

and the output $f_0$ of mixer 3'' shown in FIG. 8(*b*) is represented as $$f_0=||f_1-f_2|-|f_1'-f_2'||$$

The fail-safe type multi-input logic product circuit such as shown in FIGS. 8(*a*) and 8(*b*) are constructed in this manner and operate as in the above example. Furthermore, it is realized equally that the principle of the two input fail-safe logic circuit system can be extended to multi-input systems such as a three or more input (*n* input) fail-safe logic product circuit, using the non-linear characteristic of mixing these input signals by utilizing third or higher powers (*n*th power) characteristics of the non-linear characteristics between the base and emitter of the transistor $T_2$.

On the basis of the above mentioned fail-safe type logic product circuit, a fail-safe type exclusive-or circuit, a fail-safe type logic sum circuit, a fail-safe type logic negation circuit, a fail-safe type fixed memory circuit and a memory circuit, respectively, can be presented.

Figure 7:
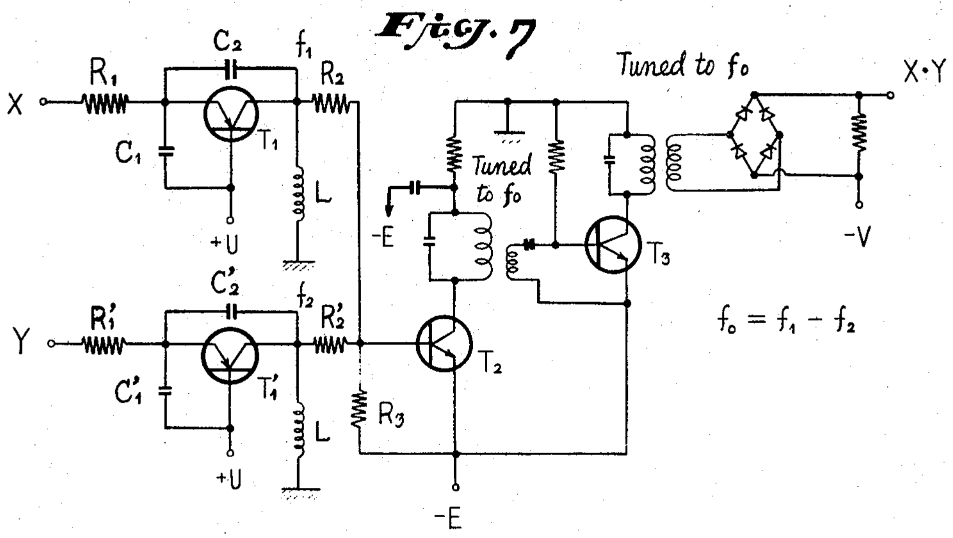
FIG. 7 shows a circuit diagram of an embodiment of a fail-safe type logic product circuit with two inputs, which is constructed with the basic logic circuit of FIG. 5.

Referring now again to the drawings, and more particularly to FIG. 9, there is shown an oscillator with a certain threshold level which operates in response to the logic variable 0 (—V). (The threshold voltage is assumed as —U and $|-V|>|-U|$.) The p-n-p type transistor $T_1$ in FIG. 7 is replaced by an n-p-n type transistor $T''_1$. Therefore, as shown in FIG. 10, a fail-safe type exclusive-or circuit can be constructed by combination with a diode circuit. (In FIG. 10, threshold oscillator 2'' is the same as shown in FIG. 9 and the others are the same as in FIG. 6.)

In FIG. 6, by connecting oscillator 1 directly to amplifier 5, and by connecting a diode logic sum circuit to the input of the oscillator 1, a fail-safe type logic sum circuit is formed.

By connecting the output of the oscillator in FIG. 9 to the amplifier 5 in FIG. 6, a fail-safe type negation logic circuit is provided.

Fixed memory circuits and memory circuits are used as a memory circuit of a fail-safe type digital computer.

FAIL-SAFE TYPE FIXED MEMORY CIRCUIT

Referring to FIG. 11, a fail-safe type logic product circuit 11, diode 12 and selection circuits 13 and 14 are arranged such that selection circuit 13 is connected to one input of product circuit 11 and seletion circuit 14 is connected to the other input of the circuit 11 through a series connection of the diode 12 and memory plane (M.P.). The selection circuits 13, 14 select the output thereof so that only one optional output terminal has the voltage +V and the other has the voltage =V, respectively. The fixed memory contents are located in the memory plane of FIG. 11. For example, if value 1 should be selected, the terminals 15 and 16 are connected, but they are not connected to each other when the value 0 is selected. Of course, the diode may not be required when the connection is not made.

Now, when voltage +V or =V is applied to the point P in FIG. 11 from the selection circuit 13, and the voltage +V or —V is applied to the point N from the selection circuit 14, then, the output of the fail-safe type logic product circuit 11 becomes as set forth in the following table.

| | | | | |
|---|---|---|---|---|
| P | —V | —V | +V | +V |
| N | —V | +V | —V | +V |
| V | —V | —V | —V | +V |

Referring now to the table, the output of the fail-safe type logic product circuit 11 becomes +V only when the voltages selected by the selection circuits 13 and 14, and applied to the logic product circuit, are +V simultaneously, but it becomes −V otherwise.

Now, the destruction of the diode or the breaking and shorting of the wires can be considered as circuit trouble in the device. In case of wiring troubles it sometimes occurs that the fail-safe type logic product circuit does not operate, and the output voltage is −V; while the output voltage becomes +V when the diode is shorted. However it is clearly distinct from the miss operation of the product circuit because it occurs when the selected voltages are the same, +V, in this case. Namely, in this device, when the selected voltage from the selection circuits have the common value +V, the output +V of the fail-safe type logic product may become −V or 0 when the circuit trouble occurs, but it never becomes +V.

FIG. 12 shows a circuit of the present invention using the basic circuit. In this case, a miss operation due to circuit trouble can be necessarily detected when the selected outputs, from selection circuits 13 and 14, have a common value, +V, as in the case of FIG. 11. So, in this device, a miss operation due to trouble in the circuit is necessarily detected if the fixed memory devices of $n$ bits are constructed by the combination of $n$-fail-safe type logic product circuits and $n^2$ diodes.

FIG. 13 shows the fail-safe type fixed memory device. The fixed memory contents are located in M.P. in FIG. 13. For example, when the binary code is used, common bus $B_1$, $B_2$ . . . $B_n$ are connected when the value 1 corresponding to their signals, are not connected with 0. In FIG. 13, diode logic sum circuit 17 or the fail-safe type logic sum circuit is illustrated.

The check of the operation of this fail-safe type fixed memory device can be carried out by providing the conjugate fixed memory device in parallel therewith and connecting a fail-safe exclusive-or circuit in a manner similar to that previously described. As the memory contents in these fixed memory devices are opposite, exactly, the exclusive-or circuit operates in accordance with the truth value 1 when a miss operation does not exist, and it operates in response to the truth value 0 when trouble exists.

FAIL-SAFE TYPE MEMORY CIRCUIT

Referring now again to the drawings, and more particularly to FIG. 14, the fail-safe type memory circuit is shown in which a fail-safe type logic product circuit 21 is provided and diodes 22 and 23 are connected in series and in parallel, respectively, thereto. Input 24 is connected to diode 22. An output 25 and a clear-terminal 26 are connected to the circuit 21. In this circuit, the clear terminal 26 usually has the voltage +V. When the input 24 has voltage +V to be memorized the output 25 becomes +V. Further, when the input 24 becomes the voltage −V, the output 25 holds the voltage at +V, because the output voltage is fed back to the fail-safe type logic product circuit through the diode 23. If the voltage of the clear terminal 26 becomes −V, the output will become −V necessarily and the memory content is cleared. Namely, the circuit shown in FIG. 14 can be used as the memory circuit which keeps the memorized input until the clear information −V comes in. Also, the circuit correctly serves for diode failure.

We claim:

1. A fail-safe system comprising
an oscillator means for performing a logical operation and having a predetermined threshold input level and operable at a certain frequency in response to an input higher than said predetermined threshold input level,
an amplifier connected to said oscillator to amplify the output signal of said oscillator,
a rectifier connected to the output of said amplifier to rectify the output signal of said amplifier, and
a power supply means for applying a predetermined bias voltage, the maximum voltage of which being equal to said predetermined threshold input level, making binary codes 1 and 0 to be used in said system correlate to D.C. voltages +V and −V, respectively, and causing the output voltage level of said system to be −V or 0 in case any failure occurs in said system while the normal output voltage being +V and the output voltage level of said system being −V or 0 in case any failure occurs in said system while its normal output voltage is −V, whereby the output voltage never becomes +V when any failure occurs.

2. A fail-safe type logic product circuit comprising
a pair of oscillator means each having a predetermined threshold input level and operable in response to the truth value 1 of either one of two input logic variables and having different frequencies from each other, respectively, said different frequencies being correlated to said logic variables, respectively,
an amplifier means for amplifying the signal component of the frequency of the difference between said frequencies, and
a rectifier means for rectifying the output from said amplifier, thereby obtaining a logic product of said two logic variables as the output.

3. The circuit, as set forth in claim 2, and constituting a fail-safe type memory circuit, and further comprising
a first input terminal for said logic product circuit constituting a clear terminal,
a second input terminal for said logic product circuit being supplied with a logic sum of an input signal to be memorized and an output signal of said logic product circuit, whereby the output becomes the truth value 1 when said input signal becomes the truth value 1 and said clear signal is the truth value 1, said output is kept at the truth value 1 when said input signal becomes the truth value 0 and said clear signal is still truth value 1, said output becoming truth value 0 when both of said input signal and said clear signal are the truth value 0, and said output is kept at the truth value 0 when said clear signal is 0 and said input signal becomes 1.

4. A fail-safe type logic negation circuit comprising
an oscillator having a predetermined negative threshold voltage and operable only upon receiving a D.C. input voltage higher than the absolute value of said predetermined negative threshold voltage, said D.C. input voltage corresponding to an input logic variable,
an amplifier means for amplifying the output of said oscillator, and
a rectifier for rectifying the output of said amplifier, thereby obtaining a logical negation of said input logic variable as the output.

5. A fail-safe type exclusive-or logic circuit comprising
a first oscillator having a predetermined threshold input level and operable in response to a truth value 1 of either one of two input logic variables at a frequency,
a second oscillator having a predetermined negative threshold voltage and operable only upon receiving a D.C. input voltage higher than the absolute value of said negative threshold voltage, and
two diode OR circuits, thereby obtaining an exclusive-or of said input logic variable as the output.

6. A fail-safe type fixed memory circuit comprising
a pair of selection circuits,
a series connection of a fail-safe type logic product circuit, a diode and a fixed memory plane with or without wiring in accordance with the presence or absence of a code to be memorized therein fixedly,
said series connection being disposed between said selection circuits, and
said selection circuits selecting the contents of said memory plane whereby according to said contents of the absence or presence of wirings an output corresponding to said code is derived from said fail-safe type logic product circuit.

References Cited

UNITED STATES PATENTS

| | | | |
|---|---|---|---|
| 2,854,653 | 9/1958 | Lubkin | 235—153 X |
| 3,390,256 | 6/1968 | Clanton et al. | 235—153 |
| 3,396,369 | 8/1968 | Brothman et al. | 235—153 X |

FOREIGN PATENTS

| | | |
|---|---|---|
| 1,032,081 | 6/1966 | Great Britain. |

OTHER REFERENCES

M. C. Johnson et al.: "Error Detector or Comparator," RCA Technical Notes #293; sheets 1–2, June 1959.

DONALD D. FORRER, Primary Examiner

U.S. Cl. X.R.

307—202, 210, 214, 216, 218; 328—92; 331—56, 117; 340—173